United States Patent [19]
Deal et al.

[11] Patent Number: 5,248,078
[45] Date of Patent: Sep. 28, 1993

[54] INERTIA BONDING OF LONG SHAFTS

[75] Inventors: James L. Deal, Amston; Joseph A. Gosselin; John J. Kolesnik, both of Southington, all of Conn.

[73] Assignee: United Technologies Corporation, Hartford, Conn.

[21] Appl. No.: 58,824

[22] Filed: May 4, 1993

Related U.S. Application Data

[63] Continuation of Ser. No. 858,909, Mar. 27, 1992, abandoned.

[51] Int. Cl.⁵ .............................................. B23K 20/12
[52] U.S. Cl. .................................. 228/113; 228/114.5; 228/2.3; 279/145
[58] Field of Search .................. 228/2, 112, 113, 114; 279/46.6, 143, 145, 151, 156

[56] References Cited
U.S. PATENT DOCUMENTS

| | | | |
|---|---|---|---|
| 3,185,368 | 5/1965 | Holloway | 228/2 |
| 3,234,644 | 2/1966 | Hollander | 29/470.3 |
| 3,235,162 | 2/1966 | Hollander | 29/470.3 |
| 3,460,734 | 8/1969 | Vill et al. | 228/2 |
| 3,591,068 | 7/1971 | Farmer et al. | 228/2 |
| 3,606,968 | 9/1971 | Loyd | 228/2 |
| 4,155,563 | 5/1979 | Shupp et al. | 279/151 |

FOREIGN PATENT DOCUMENTS 0837586 6/1981 U.S.S.R. .............................. 279/156

*Primary Examiner*—Richard K. Seidel
*Assistant Examiner*—Jeffrey T. Knapp
*Attorney, Agent, or Firm*—Charles E. Sohl

[57] ABSTRACT

A process is described for inertia bonding a hollow shaft made of superalloy materials without causing compressive deformation in the shaft due to the high compressive forces generated in the segmented collet which grips the shaft. A method is also described for minimizing the residual stress in an inertia bonded joint, where the wall thicknesses of the two shaft portions to be bonded are unequal, by independently controlling the gripping forces on the portions so as to provide equal diameter reduction during the bonding process. A method for converting a front loading inertia bonding machine to a rear loading bonding machine is also described.

3 Claims, 4 Drawing Sheets

107, 138 & 148

108, 140 & 146

INERTIA BONDING OF LONG SHAFTS

This application is a continuation of Ser. No. 07/858,909, filed Mar. 27, 1992, and now abandoned.

DESCRIPTION

1. Technical Field

This invention relates to the inertia bonding of hollow articles. This invention also relates to the control of gripping pressure on the workpiece during inertia bonding, and to the inertia bonding of high strength superalloy articles.

2. Background Art

Inertia bonding is a process used to join metallic components which are generally symmetrical about an axis of rotation. Such components may be solid or hollow. Thus for example inertia bonding can be used to join components together to form an article such as a solid crankshaft or a bonded hollow tube assembly. The inertia bonding process is described for example in U.S. Pat. Nos. 3,234,644; 3,235,162; and 3,591,068, which are incorporated herein by reference.

Various techniques for gripping the workpiece during inertia bonding have bee developed. An effective means includes the use of a conical segmented collet surrounding the workpiece, and interacting with a mating collet seat. When the axial force necessary for bonding is applied, the reactive force created at the bond joint is translated into a radial gripping force by the collet, with the gripping force being a linear function of the axial force. U.S. Pat. Nos. 3,185,368 and 3,460,734 show typical inertia welding machines which employ this technique.

Briefly, in inertia bonding the components to be joined are located and positioned so that their axes of symmetry coincide and the surfaces to be joined are in a parallel relationship. Typically, one of the components is held stationary, and the other is attached to a rotatable flywheel. The rotatable component-flywheel combination is accelerated to a predetermined rotational speed, the source of rotational power is disengaged, and the stationary component is forced against the rotating component. The flywheel geometry, mass and rotational speed determine the available kinetic energy, and this kinetic energy is dissipated (converted into thermal energy) by friction when the components to be joined are forced together. The temperature increase due to the dissipated kinetic energy causes localized softening of the ends of the components. When the flywheel rotation stops, the force between the components is maintained or increased, permitting the softened portions of the components to form a metallurgical bond. The force between the components causes plastic or superplastic deformation in the bond zone, resulting in expulsion of a significant amount of material from the bond zone, thus inherently removing detrimental surface contamination. Cooling of the bond zone by conduction of heat into the components occurs fairly rapidly.

The microstructure of the inertia bond zone is more characteristic of a forging than a casting, because the material in the bond zone does not melt during the inertia bonding operation. Joints produced by other forms of joining, such as laser, electron beam and electric or gas fusion welding, have been melted and resolidified, and have the characteristics of a casting. Weld zones with the characteristics of a casting are generally less desirable than those with the characteristics of a forging, primarily due to segregation of the alloying elements during the resolidification process.

Inertia bonding is a form of friction bonding. Another form of friction bonding relies on a continuous motor drive, rather than flywheel-stored energy, to provide frictional heating. As used herein, the term inertia bonding includes other forms of rotational friction bonding.

Inertia bonding was initially developed and has been widely used in joining ferrous materials such as iron and steel in the heavy construction equipment industry. Inertia bonding has been further developed to join non-ferrous metals such as aluminum and titanium in the fabrication of one-piece multiple disk drum rotors for gas turbine engines.

A typical inertia bonding machine is shown in FIG. 1. Machines of this type are commonly used for the inertia bonding of drum rotors. A rotating chuck 2 is mounted on a stationary headstock 3, and a non-rotating chuck 4 is mounted on a translatable tailstock 5. Tie rods 8 prevent the force applied during a bonding operation from displacing the headstock relative to the tailstock, which would result in misalignment of the bonded components.

For the inertia bonding of a drum rotor, as shown in FIG. 2, a disk 10 is mounted in a segmented collet 12, with a backup support 14 which provides both radial and axial support to the disk 10. The segmented collet 12 is positioned in a matinq conical collet seat 16. A flywheel 18 provides a means of storing kinetic energy needed for the bonding process. A partial drum 20, to which the disk 10 is to be bonded, is mounted in a segmented collet 22, which is positioned in a mating conical collet seat 24. A drawbar cylinder 26, attached to a collet adaptor 28, draws the collet 22 into the collet seat 24 to eliminate any gaps among the partial drum 20, the collet 22 and the collet seat 24 prior to bonding.

A hydraulic cylinder 30 (see FIG. 1) applies a force coincident with the axis of the drum rotor 20, hereinafter referred to as an axial force, to a thrust bridge 32, which moves the collet seat 24 toward the headstock. This causes the collet seat 22 and partial drum 20 to move toward the disk so that the partial drum 20 contacts the rotating disk 10, and the bonding operation can take place.

During an inertia bonding operation, the disk 10 is rotated by setting the chuck 2 into motion. When the chuck reaches the rotational velocity which will provide the required kinetic energy, the rotational force is terminated and the chuck rotates freely. The axial force represented by the arrow 34 is applied to the tailstock so as to bring the surface 36 of the partial drum 20 into contact with the surface 38 of the disk 10. The kinetic energy stored in the rotating chuck 2 is dissipated by the friction developed between the surfaces 36, 38. The friction generates sufficient heat at the interface between the surfaces 36, 38 to soften the material and cause bonding of the disk 10 to the partial drum 20.

As the axial force 30 brings the partial drum 20 into contact with the disk 10, a reactive force represented by the arrow 40 is created in the chuck 2. The effect of this reactive force is to move the segmented collet 12 relative to the collet seat 16. This relative movement along the conical interface 42 between the segmented collet 12 and the collet seat 16 causes the segments of the segmented collet 12 to move radially inwardly and increase the applied radial force 44 on the disk 10. This increased radial force insures that the disk 10 will not slip relative to the rotating segmented collet 12 when the disk 10 is brought into contact with the partial drum 20 to produce the inertia bonding action.

Similarly, the segmented collet 22 operating inside the collet seat 24 provides a clamping pressure on the partial drum rotor 20 which is a function of the applied axial bonding force, and which is sufficient to prevent slippage of the partial drum 20 relative to segmented collet 22.

The inertia bonding machines used for fabricating drum rotors are typically front-loading. The tailstock of the machine is moved laterally away from the headstock, and the components to be bonded are loaded into the bonding machine from the space between the headstock and tailstock portions of the machine.

A need has arisen to bond together two portions of a low pressure turbine shaft for a gas turbine engine which has an overall length of approximately ten feet. The shaft to be bonded is made of a nickel-base superalloy. This material, selected because of its high strength at elevated temperatures, requires high axial forces in order to generate sufficient frictional heat during the bonding operation to soften the material to a state where a satisfactory bond can be formed between the two portions of the shaft.

When sufficiently high axial forces for bonding are obtained, correspondingly high radial gripping forces are generated through a conventional segmented collet system. The gripping forces are sufficiently high that a hollow superalloy shaft would be permanently deformed by compression of the material if the gripping force were to be applied directly to the shaft. Although internal backup devices are frequently used to support hollow articles being clamped for inertia bonding, as indicated by the backup support 14 in FIG. 1, the clamping forces generated in a superalloy shaft would be so high that support materials commonly available are not strong enough to provide the required support. In addition, the internal bottle shape of the shaft after bonding precludes the removal of an internal support member by any practical means.

Additionally, since the two portions of the shaft have different wall thicknesses in the region where they must be gripped for the bonding operation, the compressive forces generated by the conversion of the axial bonding force through the segmented collets can result in uneven reduction in diameter of the two portions of the shaft. If the two shaft portions are reduced in diameter unequally during the bonding operation, a high residual stress will be generated in the bond joint when the bonded shaft is released from the gripping devices because the two shaft portions tend to return to their pre-bonding configurations. This high residual stress contributes to a decreased service lifetime for the shaft.

It is desirable to use an existing machine capable of bonding drum rotors for the bonding of long shafts in order to avoid the high cost and long lead time of purchasing a bonding machine custom designed to accommodate this requirement. It is also desirable to have a bonding machine which can be converted for use either as a drum or shaft bonding machine. Since the typical drum rotor bonding machine is front loading, and the available space between the headstock and tailstock is insufficient for the front loading of a long shaft, a rear loading capability becomes essential.

The typically available bonding machines have gripping devices which include segmented collets in mating collet seats. Upon the application of an axial bonding force, the collets exert gripping forces on the components being bonded which are a function of the applied axial bonding force. The only means of varying the gripping pressures on the two components would be to either use collets with different cone angles, thus having different force multiplying factors, or to use collets having different bearing surface areas. Neither of these methods provides a workable means of obtaining sufficient variation in gripping forces.

Accordingly it is an object of this invention to provide an inertia bonding machine which is capable of being converted from bonding of drum rotors to bonding of long shafts. It is another object to provide a means for gripping two portions of a hollow shaft which have different wall thicknesses such that the reduction in diameter of the two portions due to the gripping forces during an inertia bonding operation is the same in each portion of the shaft. It is still another object to provide a means of gripping hollow superalloy shafts such that the radial gripping forces on the shaft will not cause permanent deformation in the shaft material.

DISCLOSURE OF INVENTION

A front loading inertia bonding machine is made convertible to be capable of bonding long shafts by removing the collet seat, segmented collet, drawbar cylinder, and other associated components used for bonding drum rotors from the tailstock. These components were replaced with a new collet seat, a segmented collet with a hollow piston attached for applying an axial force to the segmented collet, a second segmented collet and collet seat with a hydraulic cylinder for supporting the rear of the shaft, and various other components required for the bonding of long shafts. Spring rings were also required to compensate for the large difference in diameters between drum rotors and shafts.

In the shaft bonding configuration, the long portion of the shaft is loaded into the tailstock from the rear of the machine. When the shaft is in position in the machine, the various components referred to above are installed around the shaft in the tailstock.

A hydraulically operated piston attached to the rear of the segmented collet applies an axial load to the segmented collet, which in turn applies a radial gripping force through a spring ring to a heavy split ring, hereinafter referred to as a sabot, which is sufficient to prevent slippage between the sabot and the spring ring during the bonding operation. The gripping force is controlled to the appropriate magnitude to limit the reduction of the diameter of the shaft portion in the tailstock, which has a thinner wall section than the portion held in the headstock, to the same amount as the reduction in diameter of the shaft portion in the headstock due to the gripping force generated as a function of the axial bonding force acting through the segmented collet in the headstock. The axial bonding force is applied directly to the end of the shaft portion in the tailstock, rather than to the collet seat, as in a conventional drum bonding operation. This avoids creating any reactive force through the tailstock segmented collet which would increase the gripping force, as happens in the headstock.

The sabot, when attached around the outside of the shaft, effectively increases the wall thickness of the shaft. Since it is impractical to use an internal support, the sabot provides the additional compressive load carrying capability necessary to prevent permanent deformation of the shaft when the high axial bonding force necessary for bonding superalloy materials is applied.

The foregoing and other features and advantages of the present invention will become more apparent from the following description and the accompanying drawings.

BRIEF DESCRIPTION OF DRAWINGS

FIG. 6 is an enlargement of the portion of FIG. 3 indicated by the line 6—6.

BEST MODE FOR CARRYING OUT THE INVENTION

The conversion of a conventional drum rotor inertia bonding machine to a machine capable of bonding long hollow shafts required that the tailstock portion of the machine be converted from front loading to rear, or breech, loading capability. All of the internal working components of the tailstock portion which are used for drum rotor bonding were removed and replaced by components which are used for shaft bonding. These components are easily removable to facilitate loading and unloading of shafts. In addition to having a machine to bond long shafts, the capability of reconverting for bonding of drum rotors was retained.

Figure 1:
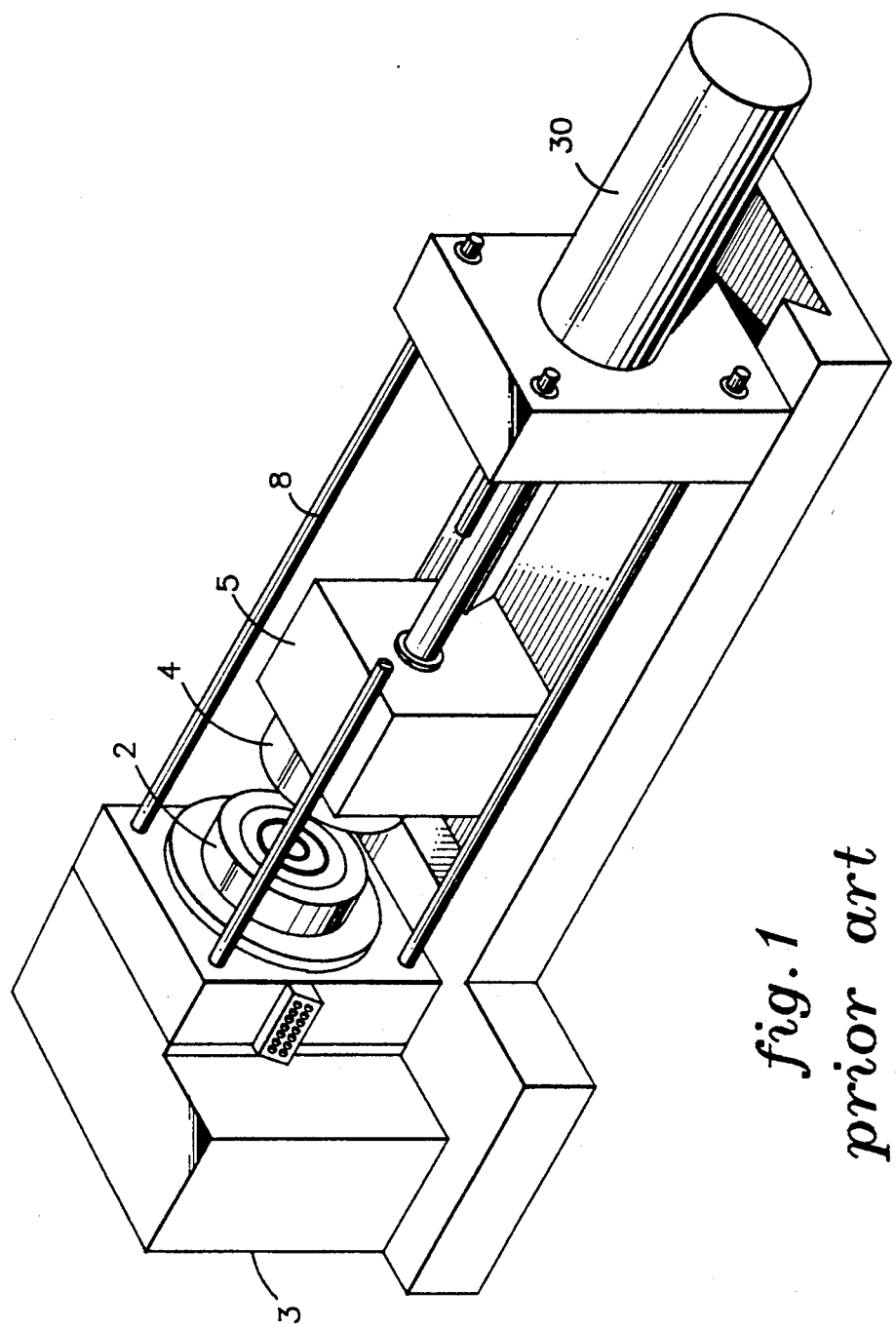
FIG. 1 is a schematic drawing of a typical machine for inertia bonding of drum rotors.
Figure 2:
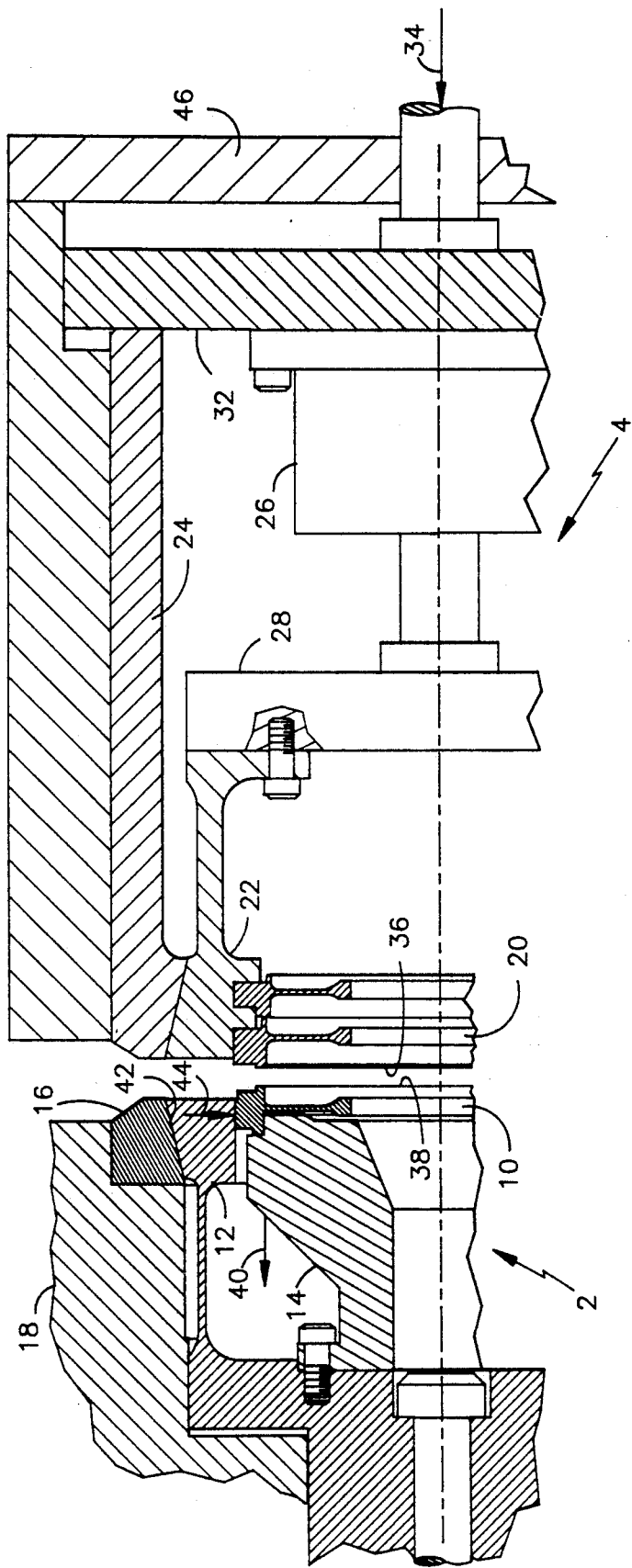
FIG. 2 is an enlargement of a portion of the inertia bonding machine in FIG. 1.

Referring to FIG. 2, the components which must be removed from the tailstock 5 when in the configuration for bonding drum rotors include the segmented collet 22, the collet seat 24, the drawbar cylinder 26, the collet adaptor 28, the thrust bridge 32, and the rear bridge 46.

Figure 3:
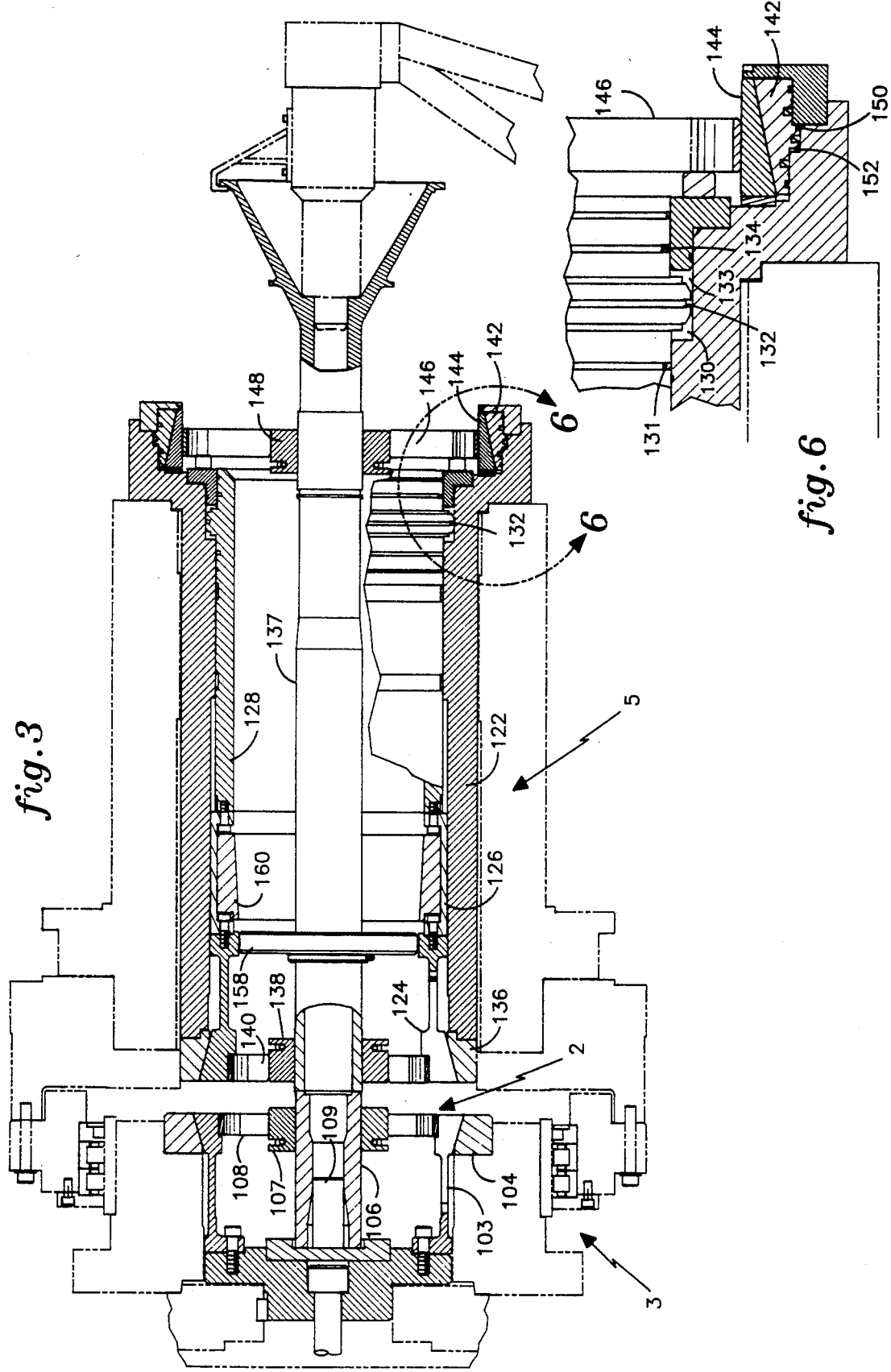
FIG. 3 is a sectional drawing of an inertia bonding machine for bonding long shafts.
Figure 4:
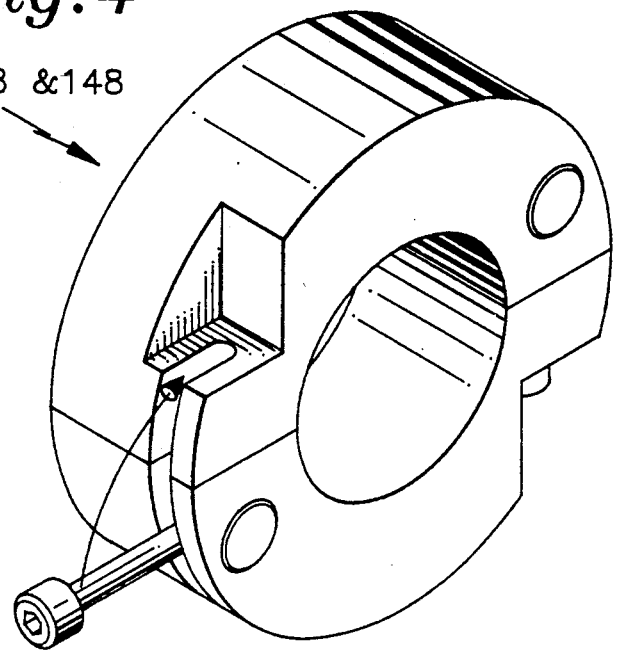
FIG. 4 is a perspective drawing of a typical sabot.
Figure 5:
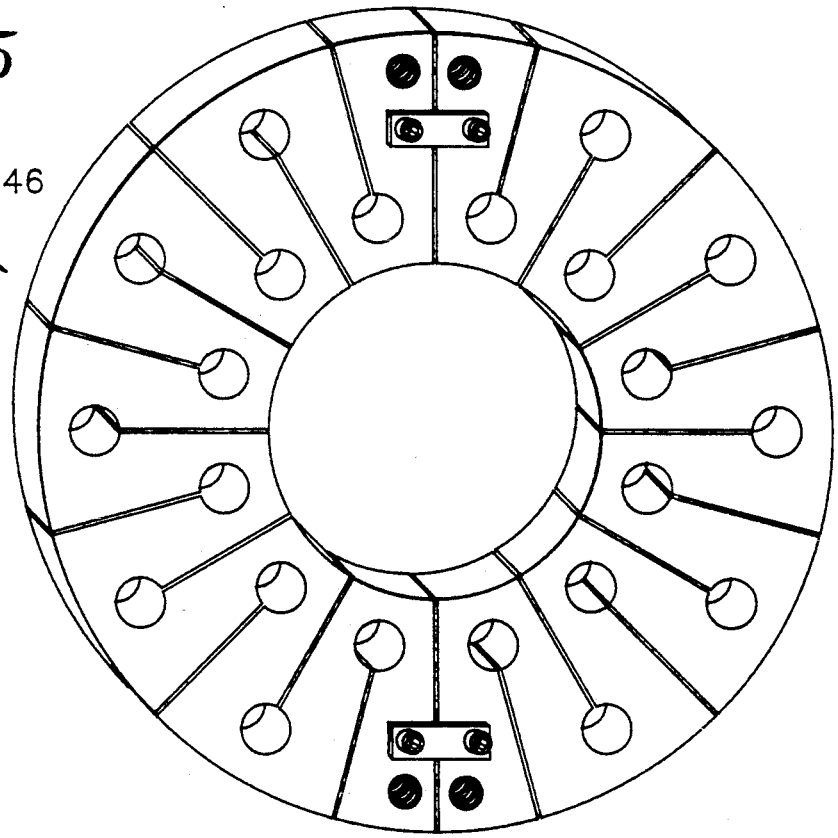
FIG. 5 is a perspective drawing of a typical spring ring.

Referring to FIG. 3, which shows a drum bonding machine after reconfiguring for bonding of long shafts, the headstock 3 retains the general characteristics of a conventional inertia bonding machine. The segmented collet 103, positioned inside a collet seat 104, is mounted to the rotating chuck 2, which is supported on the headstock base (not shown), so that the axial bonding force is transmitted through the segmented collet 103 to provide the radial force required to prevent the shaft portion 106 from slipping during the bonding operation. A sabot 107, which is illustrated in FIG. 4, is fastened around the shaft portion 106, and a spring ring 108, such as illustrated in FIG. 5, is positioned between the segmented collet 103 and the sabot 107, in order to minimize the amount of expensive part-specific tooling required to convert between bonding of shafts and drums. A locator 109 fits inside the shaft portion 106, and serves to maintain proper alignment of the shaft during the bonding operation.

In the tailstock 5, a cylinder 122 surrounds a hydraulic piston, which consists of a segmented collet 124, a collet extension 126, and a piston tube 128. Referring now to FIG. 6, a hydraulic chamber 130, extending between the two hydraulic sealing rings 131, 132 provides the actuating force which draws the segmented collet 124 into the collet seat 136 to provide a gripping force on the shaft portion 137 through the spring ring 138 onto the sabot 140 when pressurized hydraulic fluid is directed into the chamber 130. A hydraulic chamber 133 extending between the two hydraulic sealing rings 132, 134 releases the gripping force on the shaft portion 137 in a similar manner.

The collet seat 142 and the segmented collet 144 provide a gripping force through the spring ring 146 onto the sabot 148, with the actuating force for the collet seat 142 provided by the hydraulic chamber 150 and the hydraulic chamber 152 in a manner similar to that described above. The gripping force provided at this point on the shaft portion 137 is strictly for alignment with the shaft portion 106 in the headstock, rather than to prevent the shaft portion 137 from slipping during bonding.

A hydraulic cylinder (not shown) applies an axial bonding force directly to the end of the shaft portion 137. This causes the tailstock 5, which is on a movable base (not shown), to move toward the headstock 3 until the two shaft portions 106, 137 come into contact. Because the shaft portion 137 is fixtured firmly to the tailstock 5 by means of the hydraulic force applied independently through the collet seat 136, and the tailstock 5 moves with the shaft portion 137 when the axial bonding force is applied, the collet seat 136 moves the same amount as the shaft portion 137, and no clamping force is generated through the segmented collet 124 during the bonding operation.

A support 158 is clamped around the shaft portion 137 prior to loading the shaft portion into the bonding machine. The support 158, made of a nylon material, helps to guide the shaft portion 137 into the hydraulic piston without impinging on the inner surfaces of the piston, and supports the shaft portion in position while the locating and gripping components are installed. A guide ramp 160, also made of a nylon material, assists the support 158 in centering the shaft portion 137 properly as the shaft portion is moved into position.

Independent Control of Gripping Force

In order to control residual stresses in the bond joint between shaft portions of different wall thicknesses, it is necessary to independently control the amount by which the diameter of each portion of the cylindrical shaft is reduced by the radial clamping force. This requires that one portion of the shaft be gripped by a means independent of the force generated through the segmented collet by conversion of the axial bonding force to a radial force.

In this invention, the headstock is used in the conventional manner, whereby the radial gripping force is generated through the segmented collet as a function of the axial bonding force. Referring again to FIG. 3, the radial clamping force in the tailstock 5 is generated by applying an axial load directly to the segmented collet 124 by means of the hydraulic pressure system described above. This reduces the diameter of the segmented collet 124, and increases the radial gripping force applied through the spring ring 138 and the sabot 140 to the shaft portion 137.

When the axial bonding force is applied to the end of the shaft portion 137, and the shaft portions 106, 137 are forced together, a reactionary force is transmitted through the segmented collet 103 in the headstock 3 to establish the radial clamping force on the shaft portion 106. However, the reactionary force in the tailstock 5 is not transferred to the segmented collet 124, because the collet seat 136 is not fixed relative to the floor, but is free to move with the tailstock 5.

Thus the radial gripping force on the shaft portion 137 in the tailstock 5 can be established independently of the axial bonding force required to generate the heat required at the bond joint to provide a good quality bond joint. In practice, the magnitude of the radial gripping force in the tailstock 5 is selected to reduce the diameter of the shaft portion 137 in the tailstock 5 the same amount that the diameter of the shaft portion 106 in the headstock 3 is reduced by the gripping force generated there as a function of the axial bonding force.

Preventing Compressive Deformation of Shaft

The compressive force generated by the axial bonding force required for superalloy materials is high enough in a conventional gripping system, where the gripping force is transmitted directly from the segmented collet to the shaft, to permanently deform the material of the shaft in compression. Even if it were operationally practical to use a support device inside the shaft, the commonly available materials are not strong enough in compression to resist the compressive forces generated.

To control the amount of force applied to the shaft, which is particularly important in the headstock, where the radial gripping force is a direct function of the axial bonding force, this invention uses a sabot, which is attached around the shaft at the point where gripping is required. By, in effect, adding material to the outside of the shaft, the sabot increases the effective wall thickness of the shaft.

The sabot, as shown in FIG. 4, is a split ring having a heavy cross-section. The inside diameter of the sabot is machined within 0.002" greater than the shaft diameter, and is ground to provide good contact with the surface of the machined shaft. The smooth surfaces assure sufficient static friction to prevent slippage between the sabot and the shaft, with the static friction being generally sufficient to prevent slippage without additional radial force being provided by means of the segmented collets. The cross-sectional dimensions of the sabot are sufficient that, when the high radial gripping force generated as a function of the axial bonding force is applied, the sabot/shaft combination will be compressed less than the amount which would cause permanent deformation of the underlying shaft. This provides a more effective means for preventing permanent deformation of the shaft than supporting the shaft by an internal support.

Even though the sabot will greatly reduce the amount of compression during bonding of the shaft, a significant amount of diameter reduction will still occur. This diameter reduction is dependent on radial gripping force, the wall thickness of the shaft and the dimensions of the sabot, and will result in residual stresses in the bond joint if diameter reductions in the portions being bonded are unequal. Thus, even when using a sabot, independent control of radial gripping forces will still be required.

An alternate method of controlling the relative gripping forces applied to the two shaft portions in a conventional bonding machine, where the bonding force is applied through the collet seat and both the headstock and tailstock gripping forces are thus a function of the axial force, would be to use sabots which have been designed for the specific parts being bonded to permit equal amounts of compressive deformation under the radial gripping forces generated as a function of the axial bonding force.

This invention will be better understood by reference to the following illustrative example.

EXAMPLE

Two portions of an Inconel 718 low pressure turbine shaft for a gas turbine engine were inertia bonded. Inconel 718 has a nominal composition of 19% Cr, 18% Fe, 0.9% Ti, 0.6% Al, 3% Mo, 5.1% (Cb+Ta), balance nickel. The shaft was approximately ten feet long, with a bond interface area of about 12.5 in$^2$. A gripping force of about 950,000 pounds was applied to the sabot in the tailstock. Using a flywheel having a mass of 60,000 WK$^2$ and rotating the headstock chuck at about 350 RPM, an axial bonding force of 55,000–65,000 psi was applied to the end of the shaft. The gripping force generated in the headstock chuck was approximately 2.8 times the gripping force in the tailstock.

The bonded shaft showed no signs of permanent deformation due to the gripping forces generated during the bonding process. A residual stress measurement in the bond joint showed approximately 15,000 psi residual stress, which was within acceptable limits for this shaft.

Although this invention has been shown and described with respect to detailed embodiments thereof, it will be understood by those skilled in the art that various changes in form and detail thereof may be made without departing from the spirit and scope of the claimed invention.

We claim:

1. A method for forming an inertia bond joint between a first portion and a second portion of a hollow high-strength superalloy shaft which reduces residual stresses in the bond joint wherein the improvement comprises:
   a. positioning the first shaft portion in a non-rotatable chuck in a tailstock;
   b. positioning the second shaft portion in a rotatable chuck in a headstock;
   c. applying a first gripping force to the first shaft portion;
   d. rotating the second shaft portion; and
   e. applying an axial bonding force to the first shaft portion to move the first shaft portion into contact with the second shaft portion, the movement of the first shaft portion causing a second gripping force, which is a function of the axial force, to be applied to the second shaft portion, such that the first gripping force reduces the diameter of the first shaft portion approximately the same amount as the second gripping force reduces the diameter of the second shaft portion during the formation of the bond joint.

2. In a method for inertia bonding, an inertia bonding machine including a segmented collet surrounding a workpiece and a mating collet seat fixedly mounted to a tailstock and moving freely in axial alignment with the workpiece when a first axial force is applied directly to the workpiece, the improvement comprising gripping the workpiece by applying a second axial force directly to the segmented collet so as to cause the segmented collet to interact with the collet seat thus applying a radial gripping force to the workpiece, the radial gripping force being independent of the first axial force.

3. A method for gripping a hollow high-strength superalloy workpiece in an inertia bonding machine, which includes a collet seat and a mating segmented collet surrounding the hollow workpiece, the improvement which comprises:

a. clamping a sabot around the outside of the hollow workpiece; and
b. applying an axial bonding force such that the segmented collet transmits a gripping force, which is a function of the axial bonding force, to the sabot; wherein the sabot, in combination with the hollow workpiece, absorbs a portion of the radial gripping force so as to prevent permanent compressive deformation of the hollow workpiece.

* * * * *